United States Patent Office 3,447,196
Patented June 3, 1969

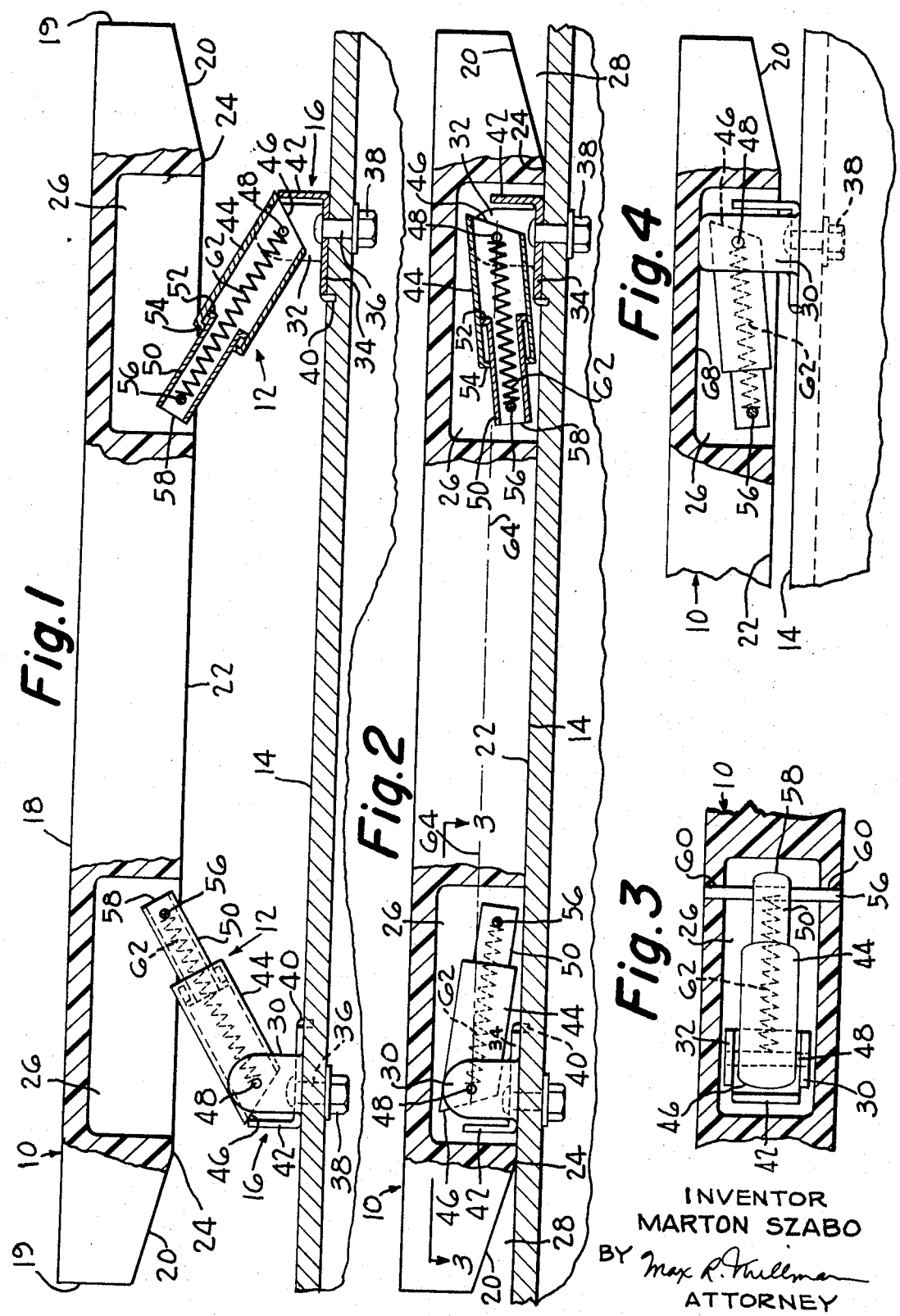

3,447,196
COLLAPSIBLE HANDLE OPERABLE BY EXERTION OF A PUSH DOWNWARDLY ON ONE END THEREOF
Marton, Szabo, Broomall, Pa., assignor to Philadelphia Handle Company, Inc., Camden, N.J., a corporation of New Jersey
Continuation-in-part of application Ser. No. 630,389, Apr. 12, 1967. This application Mar. 21, 1968, Ser. No. 714,975
Int. Cl. A45c 13/22, 13/26; E05b 5/00
U.S. Cl. 16—115                                                7 Claims

ABSTRACT OF THE DISCLOSURE

A collapsible handle for a carrying case, luggage and the like wherein the handle can be raised from its collapsed position by first depressing one end of the handgrip to raise its other end and then releasing the depressed end, the construction of the linkage means pivotally connecting the handgrip to the case wall being such as to provide toggle action to positively retain the handle in its collapsed position and spring action to positively raise the handle and prevent it from overturning.

---

This is a continuation-in-part of my copending application Ser. No. 630,389 filed Apr. 12, 1967.

The primary object of this invention is to provide a collapsible handle having resiliently operable linkage means pivotally connecting the handgrip to the carrying case wall which acts to positively retain the handle in its collapsed position and to assure that the handgrip is raised positively and without overturning when one end of the handgrip is first depressed and then released.

An important object of the invention is to provide a collapsible handle with telescoping linkage pivotally connecting the handgrip to the case wall with spring means under compression at all times urging the linkage into an extended position and with the pivotal connections so located as to provide toggle action to retain the handle in its collapsed position and positive action urging the handle upwardly to its raised position, with stop means assuring this positive action and preventing the handle from overturning once one end of the handle has been raised by depressing its other end and then releasing the depressed end.

Another object of the invention is to provide a handle of the character described which is strong, durable and relatively easy to manufacture and assemble.

These and other objects of the invention will become more apparent as the following description proceeds in conjunction with the accompanying drawings, wherein:

FIG. 1 is a side elevational view of the handle shown in the raised position, parts being broken away to show details of construction;

FIG. 2 is a view similar to FIG. 1 showing the collapsed position of the handle;

FIG. 3 is a sectional view taken on the line 3—3 of FIG. 2; and

FIG. 4 is a fragmentary view illustrating a modified form of the invention.

Specific reference is now made to the drawings in which similar reference characters are used for corresponding elements throughout.

The handle comprises three essential components, the handgrip 10, linkage 12 pivotally inter-connecting the handgrip with the wall 14 of a carrying case, luggage or the like, and hardware 16 by which the linkage is pivotally connected to the wall.

The handgrip 10 may be made of any suitable material but is preferably molded of plastic and includes an upper surface 18, end walls 19 which are tapered at their undersurface as at 20 and a substantially flat lower surface 22 which joins the tapered surfaces at rounded corners 24. At predetermined positions inwardly of the end walls, the handgrip is provided with recesses 26 which open through the lower surface 22 and are dimensioned to encompass the linkage 12 and hardware 16 to hide these components when the handle is in its collapsed position with the lower surface 22 adjacent or against the case wall 12. When the lower surface 22 abuts the case wall as shown in FIG. 2, the tapered portions 20 of the end walls of the handgrip are spaced above the case wall 14 as at 28.

The hardware 16 in the form of the invention shown in FIGS. 1–3 is a generally U-shaped anchoring member having laterally spaced apertured upstanding ears 30 and 32 connected by a web 34 which bears against the case wall 14 and is secured thereto by an appropriate means such as a headed screw 36 and closure nut 38, and the like. If desired the inner end of the web can have a downturned hook extension 40 which extends into a suitable aperture in the case wall to restrain the hardware against rotation when it is mounted to the case wall. The other or outer end of the web 34 is provided with an upstanding lug or stop 42 of predetermined height.

The linkage 12 is the same for both ends of the handle. Each is a resiliently telescoped unit comprising a lower outer tubular member 44, the lower end 46 of which is cut on an outward angle greater than 90° to the axis of the member 44 rather than diametrically thereof. The lower end portion of the lower member 44 is received between the ears 30 and 32 and a transverse pin 48, preferably a double headed rivet, extends through the ears and diametrically through the lower member 44. Slidably telescoped in the lower tubular member 44 is an upper inner tubular member 50, there being cooperative flange means 52 and 54 to prevent separation of telescoped members. A transverse pin 56 extends diametrically through the upper member 50 adajacent its outer end 58, the ends of which pin are rotatably received in appropriate bores 60 in the walls of the handgrip on both sides of the recess 26 as shown in FIG. 3, to pivotally secure the member 50 to the handgrip about a transverse axis substantially parallel to that of the pivot pin 48. A spring 62 under compression is disposed in the assembled telescoped members 44 and 50 and terminally abuts the pivot pins 48 and 56, the spring normally urging the telescoped members apart.

In use, when going from the raised position of FIG. 1 to the collapsed position of FIG. 2, a downward pressure on the handle, preferably at its center, will cause each spring 62 to compress further and the upper members 50 of the linkage to move further inwardly in the lower outer members 44 and thus shorten the linkage. As this occurs, rotation around the pivot pins takes place until the linkage snaps into a final collapsed position and becomes confined within the handgrip recesses. In so doing, the pivot pins 56 first reach the horizontal line 64 which connects the pivot pins 48 and then pass below that line, that is in the final collapsed position of the handle the pivot pins 56 are below the pivot pins 48 to produce, cooperatively with the springs, a toggle action which exerts a force retaining the hand-grip against the case wall 14 with its lower surface 22 substantially flat against the case wall.

To raise the handle, finger pressure is applied on the upper surface 18 of the handle at one of its ends, say the left end, which causes the handgrip to rock around the corner 24 as a fulcrum means until the corresponding tapered surface 20 contacts the case wall 14, as seen in FIG. 4. In so doing, the pivot pin 56 of the linkage at the other or right end of the handle moves upwardly in an arc from its down position as seen in FIG. 2 to its up position as seen in FIG. 4 at which time the right spring 56 of that linkage expands and moves the upper and lower telescoped members 44 and 50 apart to extend the linkage. That right end of the handgrip rises until the angulated lower end 46 of the lower member 44 abuts the upper edge of the stop 42.

At the depressed or left end of the handgrip, the pivot pin 56 has moved above the horizontal line 62 to overcome the toggle effect and while the left spring 62 has extended somewhat from the fully collapsed toggle position of the linkage, it is still under compression and thus has sufficient stored energy to overcome the mass of the handgrip to push the depressed or left end of the handgrip to the raised position when it is released. In the final raised or carrying position, as seen in FIG. 1, the handgrip is spaced substantially parallel above the case wall and the lower ends 46 of the outer tubular members 44 of the telescoped linkage abut the upper edges of the stops 42, the height of which stops determine the height of the handgrip above the case wall. In the carrying position, the stops also serve as load bearing members.

Thus first one end and then the other of the handgrip are positively and sharply urged upwardly to the carrying position because both springs 62 are always under compression. The springs are preferably balanced so that either end of the handgrip can first be depressed and then released to cause the handgrip to rise above the case wall. If no stops 42 were provided then after one end of the handgrip was raised by depressing the other end and then the depressed end were released, the spring associated with the depressed end would expand and cause the handgrip not only to rise but to shift in the direction of its raised end and overturn it. Thus the stops, by engaging the lower ends 46 of the telescoped links in effect prevent the links when extended from attaining perpendicularity relative to the case wall.

The modification of FIG. 4 differs only from that shown in FIGS. 1–3 and described above in that the spaced ears 66 are higher so that in the fully collapsed position of the handle, the inner surfaces 68 of the recesses 26 rest on the ears and the lower surface 22 of the handgrip is adjacent but does not abut the case wall 14. In this form of the invention, each set of ears 66 is a fulcrum around which the handgrip can rotate when its corresponding end is depressed. This avoids the necessity of rocking one end of the handgrip against the case wall to raise the other end.

While preferred embodiments of the invention have been here shown and described, it will be understood that skilled artisans may make minor variations without departing from the spirit of the invention.

I claim:

1. For use with a carrying case, a collapsible handle comprising an elongated handgrip, a pair of spaced anchoring members secured to a wall of the carrying case, a pair of upper and lower telescoping members for each anchoring member, first means pivotally securing the lower telescoping member to an anchoring member about a transverse axis, second means pivotally securing the other or upper telescoping member to the handgrip about a transverse axis, spring means under compression at all times disposed within the telescoping members normally urging them apart, and fulcrum means adjacent and beneath the ends of the handgrip when the latter is collapsed and its lower surface is adjacent the case wall so that when pressure is applied to one end of the handgrip to rock it around its fulcrum means, said second pivotal attachment means of the other end of the hand grip will move initially above its first pivotal attachment means to cause said other end of the hand grip to rise.

2. The combination of claim 1 and stops engageable with the lower ends of the lower telescoping members when the upper and lower telescoping members are extended and the handgrip is in its raised carrying position.

3. The combination of claim 2 wherein the stops are lugs upstanding from the anchoring members and the lower ends of the lower telescoping members are angulated to engage the lugs.

4. The combination of claim 1 wherein the axis of the means pivotally securing the upper telescoping member to the handgrip is below that of the means pivotally securing the lower telescoping member to the anchoring member when the handle is fully collapsed to produce cooperatively with the springs, a resealable toggle retention of the handle in its collapsed position.

5. The combination of claim 1 wherein the handgrip includes recesses opening through its lower surface to encompass and conceal the anchoring members and telescoping members when the handle is in its collapsed position.

6. The combination of claim 5 wherein said fulcrum means includes corners provided in the lower surface of the handgrip adjacent the ends thereof adapted to engage the case wall to form a fulcrum around which an end of the handgrip can be rocked.

7. The combination of claim 5 wherein fulcrum means comprises a member upstanding from each anchoring member engaging the inner wall of the recess when the handle is in its collapsed position and its lower surface is adjacent the case wall.

References Cited

UNITED STATES PATENTS 3,168,173 2/1965 Koffler _____ 16—115
3,297,120 1/1967 Bush _____ 16—115

BOBBY R. GAY, *Primary Examiner.*

D. L. TROUTMAN, *Assistant Examiner.*